(Model.)

H. B. STEVENS.
MACHINE FOR SEPARATING COFFEE, &c.

No. 270,501. Patented Jan. 9, 1883.

2 Sheets—Sheet 1.

Witnesses:
Chas. J. Buckhurst
Edw. J. Brady

H. B. Stevens, Inventor.
By Wilhelm & Bonner
Attorneys.

(Model.)

2 Sheets—Sheet 2.

H. B. STEVENS.
MACHINE FOR SEPARATING COFFEE, &c.

No. 270,501. Patented Jan. 9, 1883.

Witnesses:
Chas. J. Buchheit
Edw. J. Brady

H. B. Stevens, Inventor.
By Wilhelm & Bonner
Attorneys.

UNITED STATES PATENT OFFICE.

HENRY B. STEVENS, OF BUFFALO, NEW YORK, ASSIGNOR TO GEORGE L. SQUIER, OF SAME PLACE.

MACHINE FOR SEPARATING COFFEE, &c.

SPECIFICATION forming part of Letters Patent No. 270,501, dated January 9, 1883.

Application filed March 6, 1880. (Model.)

*To all whom it may concern:*

Be it known that I, HENRY B. STEVENS, of the city of Buffalo, in the county of Erie and State of New York, have invented new and useful Improvements in Machines for Separating Coffee and other Grains and Seeds, of which the following is a specification, reference being had to the accompanying drawings.

My invention relates to a machine for separating coffee and other grains and seeds, consisting of flat, round, and irregularly-shaped grains or kernels mixed together.

Nearly all coffee as it comes from the producer contains a quantity of round grains called "pea-grains" or "mocha," which command a higher price in the market than the flat grains of the same lot of coffee, and it is therefore important to separate these round grains from the rest.

My present invention is an improvement upon a machine for this purpose for which Letters Patent of the United States No. 210,817 were granted to me December 10, 1878; and it has for its object to effect the desired separation more completely.

My invention consists of the improvements in the construction of the machine which will be hereinafter fully described, and pointed out in the claims.

Figure 1:
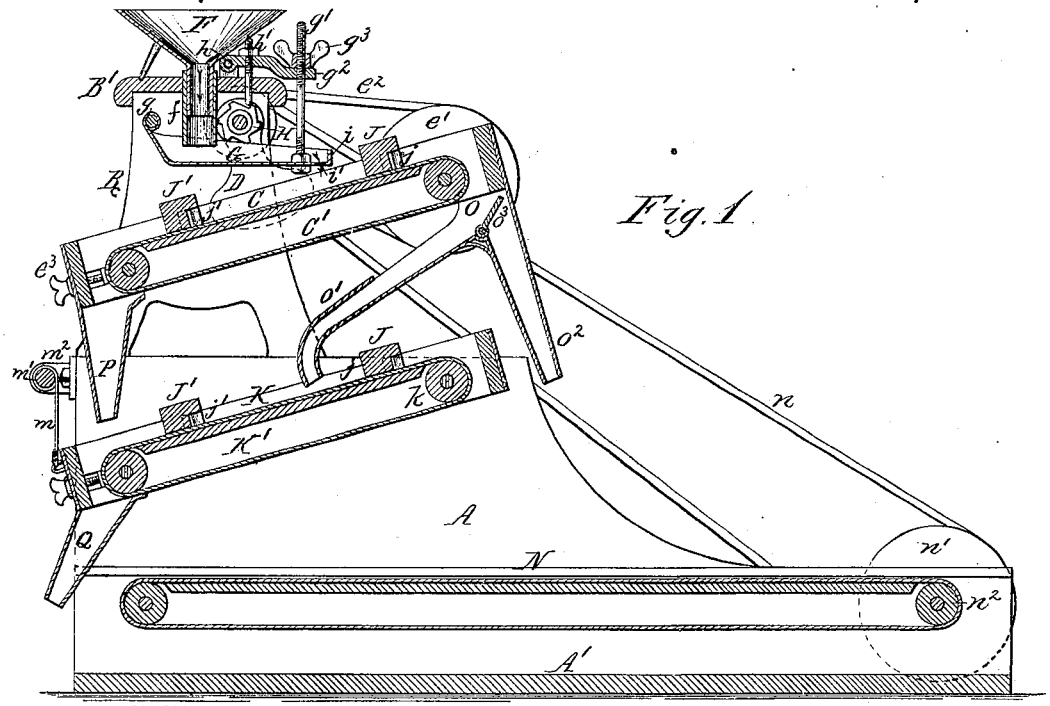
Figure 2:
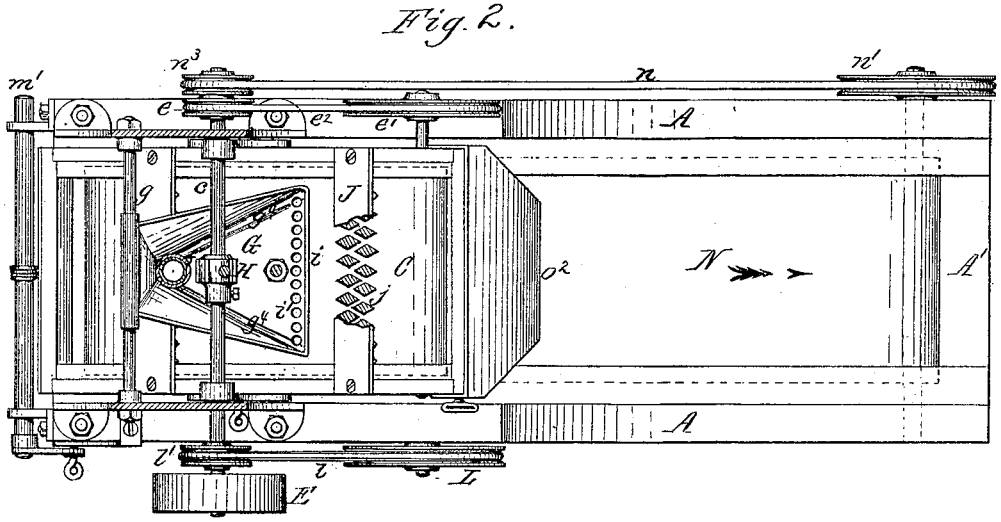
Figure 3:
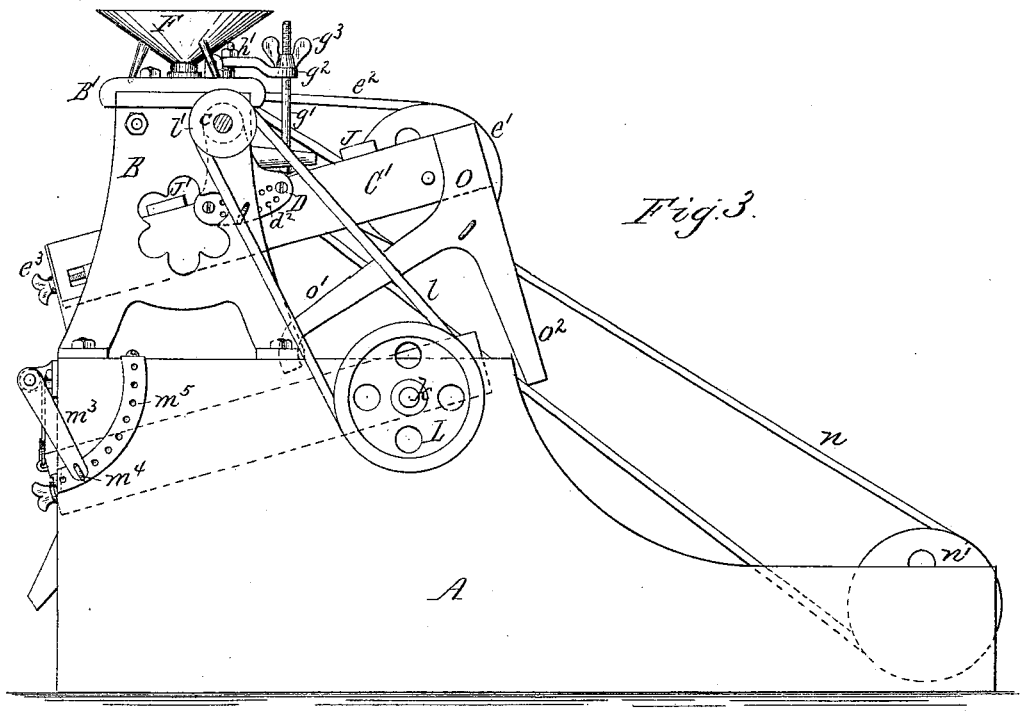
Figure 4:
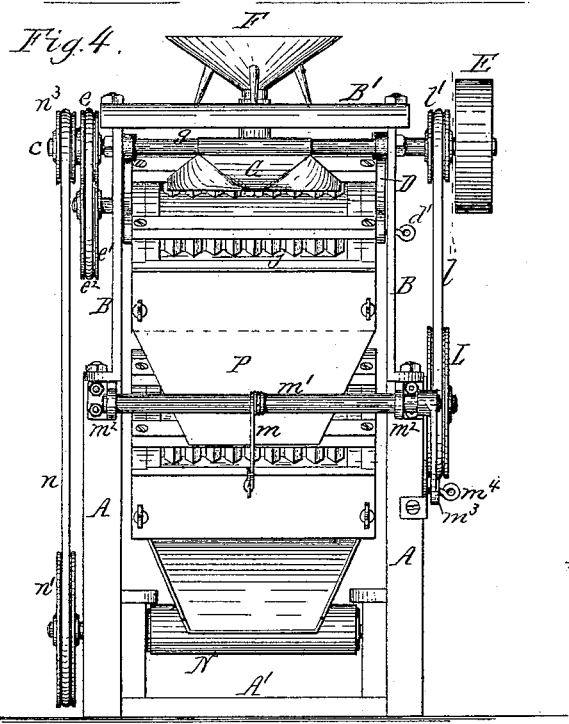
Figure 5:
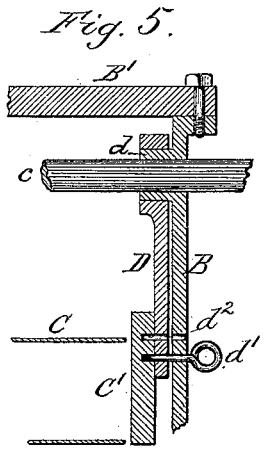
Figure 6:
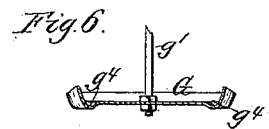

In the accompanying drawings, Figure 1 is a longitudinal vertical section of my improved machine. Fig. 2 is a top plan view thereof. Fig. 3 is a side elevation thereof. Fig. 4 is a rear elevation thereof. Fig. 5 is a sectional view, on an enlarged scale, of the means by which the upper endless apron is supported. Fig. 6 is a cross-section of the shoe.

Like letters of reference refer to similar parts in the several figures.

A A represent the lower portions of the stationary side frames of the machine, and B B the upper portions of the same. The lower portions, A A, are supported upon a bed-plate, A', and the upper portions, B B, are connected by a top plate, B'; but these parts may be connected transversely in any other suitable manner.

C represents the upper inclined endless apron, arranged in a frame, C', hung between the upper portions, B B, of the stationary side frames.

$c$ represents the driving-shaft, arranged centrally above the endless apron C, and supported in suitable bearings secured to or formed in the upper side frames, B B.

D are hangers, secured to the sides of the frame C', in which the upper endless apron, C, is arranged, and which are hung upon cylindrical collars or sleeves $d$, formed with the bearings of the driving-shaft $c$ on the inner sides of the upper frames, B, as clearly shown in Fig. 5.

$d'$ is a removable fastening pin or bolt, passing through an opening in one of the upper side frames, B, and entering one of a series of holes, $d^2$, formed in the lower portion of the adjacent hanger D, concentric with the fulcrum thereof, so that by shifting the pin $d'$ from one hole to the other the inclination of the endless apron C can be altered. Any other suitable device for securing this endless apron in position may, however, be employed.

E represents the driving-pulley by which motion is imparted to the driving-shaft $c$, and $e$ is a pulley mounted upon the opposite end of the driving-shaft and connected with a pulley, $e'$, upon the head roller of the endless apron C by an endless belt, $e^2$. By supporting the endless apron C by means of the hangers D concentric with the driving-shaft the inclination of the apron C can be altered at pleasure without affecting the length of the driving-belt $e^2$. The tail roller of the endless apron C is made adjustable in the frame C' by means of set-screws $e^3$.

F represents the feed-hopper, supported upon the top plate, B', and provided with a vertically-adjustable discharge-pipe, $f$, which delivers the grain upon the shaking-shoe G. The latter is pivoted at its rear end to a cross-bar, $g$, and attached at its front end to the lower end of a vertical rod, $g'$, which passes through the free end of a lever, $g^2$, to which it is adjustably secured by a screw-nut, $g^3$. The lever $g^2$ is pivoted to the top plate, B', at $h$, and is provided with a downwardly-projecting adjustable pin, $h'$, which rests upon a ratchet-wheel, H, secured to the driving-shaft $c$, so as to rise and fall with the teeth of the wheel H as the latter revolves, thereby imparting a vibrating motion to the shoe G. The latter is contracted at its receiving end below the tube $f$, and gradually widens toward its discharge end, which latter is made about as wide as the apron C. The sides of the shoe are bent upwardly, and its discharge end is provided with an upwardly-projecting flange or dam, $i$, which retains the grain upon the shoe, and one or more rows of openings, $i'$, in the bottom plate of the shoe, through which the grain escapes, and by means of which the grain is discharged from the entire width of the discharge end of the shoe and distributed evenly over the entire width of the endless apron C. In order to facilitate the equal distribution of the grain over the entire width of the shoe, two diverging grooves or depressions, $g^4$, are formed in the bottom of the shoe in a direction parallel with the diverging sides of the shoe.

J represents a board or bar secured transversely to the upper side of the frame C', above the delivery end of the shaking-shoe G, and provided on its under side with one or more rows of stop-pins, $j$, made angular or diamond-shaped in cross-section, as clearly shown in Fig. 2. J' is a similar board, provided with similar stop-pins, $j'$, and arranged below the shaking-shoe G. The pins $j$ $j'$ are so arranged that the grains can freely pass through the spaces between the pins singly when moving at the proper speed, but that all undue accumulation of grains or undue speed of grains will be checked thereby. The pins in the upper board, J, operate to move, agitate, and distribute small heaps of grain that might form upon the endless apron and be carried up by the motion thereof, and interfere with the free and complete separation of the round grains from the flat and irregularly-shaped grains, while the pins on the lower board, J', operate to arrest any flat grains that may tend to roll down the inclined endless apron.

K represents the lower supplementary inclined endless apron, arranged in an adjustable frame, K', between the lower stationary side frames, A, and similar in construction and operation to the upper inclined apron, C. The shaft $k$ of the head roller of the apron K is supported in fixed bearings in the side frames, A, and provided with a pulley, L, to which motion is imparted by an endless belt, $l$, from a pulley, $l'$, mounted on the main driving-shaft $c$. The rear end of the frame K' is suspended by a rope or cord, $m$, the upper end of which is wound around a shaft, $m'$, turning in bearings $m^2$, and carrying at one end an arm, $m^3$, which is held in position by means of a pin or bolt, $m^4$, passing through an opening in the end of the arm $m^3$, and entering one of a series of holes, $m^5$, arranged in one of the side frames, A, concentric with the shaft $m'$. By turning the latter in one or the other direction the rear end of the frame K' and apron K is raised or lowered and the inclination of the apron changed at the desire of the operator. The endless apron K is provided with two cross-bars, J J', provided with angular or diamond shaped stops $j$ $j'$ in the same manner as the apron C.

N is a horizontal endless apron, arranged between the lower side frames, A A, below the inclined apron K. Motion is imparted to the apron N by means of an endless belt, $n$, running over a pulley, $n'$, mounted on the roller $n^2$ of the apron and driven by a pulley, $n^3$, mounted on the driving-shaft $c$.

O is a receiving-hopper arranged below the head of the upper inclined apron, C, for receiving the flat and irregular grains carried up by the motion of the apron. The hopper O is provided with a spout, $o'$, discharging upon the lower inclined apron, K, between the cross-bars J J' thereof and a spout, $o^2$, leading directly to the horizontal apron N.

$o^3$ is a pivoted gate or valve, arranged in the hopper O at the junction of the two spouts $o'$ $o^2$, so that the grain can be directed into either of these spouts at the desire of the operator.

P is a spout leading from the tail of the upper apron, C, to the tail of the lower inclined apron, K, and Q is a similar spout leading from the tail of the apron K to any suitable receptacle.

The operation of my improved machine when used for separating coffee is as follows: The coffee, consisting of round grains, flat and irregularly-shaped grains, and black dead grains, is spouted into the hopper F, and delivered from the latter through the adjustable tube $f$ to the shaking-shoe G. The feed can be adjusted by raising or lowering the tube $f$, whereby a greater or less amount of grain is delivered upon the shoe, and by raising or lowering the pin $h'$, whereby the stroke of the lever $G^2$ is changed, and by raising or lowering the rod $g'$, whereby the inclination of the shoe G is lessened or increased. The grain is delivered upon the entire width of the upper inclined apron, C, through the holes $i'$ of the shoe G. The inclination of the apron C is so adjusted that the round grains will roll down and over the tail of the apron by gravity and be received in the spout P, while the flat, irregular, and dead grains will lodge and be carried up by the motion of the apron and be discharged over the head of the apron into the hopper O. The inclination of the apron will be so adjusted that all the round grains will roll down and that all the flat and irregular grains will lodge and be carried up. If, by bad adjustment of the feed or apron, some of the flat grains roll down with the round grains, the lower stops, $j'$, will arrest them and throw them with their flat sides upon the apron, which latter will then carry them up, while the round grains will pass through the spaces between the stops $j'$ and escape over the tail of the apron. If, from overfeeding or any other cause, the grains accumulate upon the apron, the accumulations or heaps are carried up by the apron until they come in contact with the upper stops, *j*, when the accumulations are destroyed and the grains spread out, so that if any round grains are contained therein the latter will be liberated and permitted to roll down over the apron, while the flat grains are carried up through the spaces between the stops *j* by the motion of the apron. If the coffee or other grains treated is of such character that a complete separation of the round grains from the flat, irregular, and dead grains is effected upon the upper inclined apron, C, the gate $o^3$ in the hopper O is so placed that the material received in the hopper O is delivered directly to the horizontal apron N through the spout $o^2$. If, on the contrary, the material received in the hopper O still contains round grains, the gate $o^3$ is so arranged as to deliver the material to the second inclined apron, K, through the spout $o'$, where the material is subjected to a second separation similar to that which it has undergone on the apron C. The round grains pass over the tail of the apron K, and are discharged, together with the round grains from the upper apron, C, through the spout Q, into any suitable receptacle, while the flat, irregular, and dead grains are delivered upon the horizontal apron N, and carried by the latter in the direction of the arrow toward and over the driving end of the apron. While the grain is so being carried by the apron the dead grains are readily picked out by attendants stationed at the side of the apron N.

Ordinarily no dead grains are found among the round grains discharged over the tail ends of the inclined aprons C K; but if the character of the grain should be such that some of the dead grains would pass over with the round grains, a second horizontal apron to receive the round grains can be arranged at the opposite end of the machine, when the dead grains can be separated from the round grains in the same manner that they are separated from the flat and irregular grains. If the character of the grain is such that a complete separation is not effected by the second inclined apron, the number of inclined aprons may be increased until a complete separation is obtained.

It is obvious that my improved machine may be used for separating wheat and oats and various other kinds of grain where the seeds are dissimilar in shape and size.

I claim as my invention—

1. In a machine for separating coffee, &c., the combination, with an inclined separating-apron, whereby the flat grains are elevated while the round grains are permitted to roll down and escape over the tail of the apron, of a horizontal separating-apron which receives one product of the separation from the inclined apron and carries the same a sufficient length of time to permit the removal of the worthless grains, substantially as set forth.

2. The combination, with the inclined endless aprons C K and the horizontal apron N, of the hopper O, spouts $o'$ $o^2$, and gate $o^3$, substantially as and for the purpose set forth.

3. The combination, with the pivoted shoe G, of the rod $g'$, lever $g^2$, ratchet-wheel H, and adjustable bolt $h'$, substantially as set forth.

4. The combination, with the inclined separating-apron, of two or more rows of stops, *j*, made angular or diamond-shaped in cross-section, and arranged to present sharp edges to the grain flowing over the apron, the stops in the second row being arranged behind the spaces between the stops in the first row, whereby all the flat grains are intercepted and turned on their flat sides, while the round grains are compelled to pass in a zigzag course through the spaces between the stops.

5. The combination, with the inclined separating-apron, of a feeding apparatus delivering the grain to be separated upon the apron near its head, stops *j*, arranged above the feeding-point of the apron, and stops *j'*, arranged below the feeding-point, whereby the improper movement of the grain is checked in both directions, substantially as set forth.

6. The combination, with the endless apron C and its supporting-frame C', of hangers D, secured thereto and pivoted concentric with the driving-shaft *c*, substantially as set forth.

7. The combination, with the apron C, provided with hangers D, and the apron K, rollers for carrying said apron and supporting-frame, the apron being hung upon the shaft of its head roller, of the driving-shaft *c*, pulleys *e* *e'* and driving-belt $e^2$, and pulleys L *l'* and driving-belt *l*, substantially as shown and described.

8. The combination, with an inclined endless apron, C, adapted to separate flat from round grains, of a supplementary separating-apron, K, of similar construction, arranged below the apron C, and a spout, $o'$, whereby the grain discharged from the head of the apron C is conducted upon the apron K, below the head thereof, for a second separation, substantially as set forth.

H. B. STEVENS.

Witnesses:
EDWARD WILHELM,
JNO. J. BONNER.